UNITED STATES PATENT OFFICE.

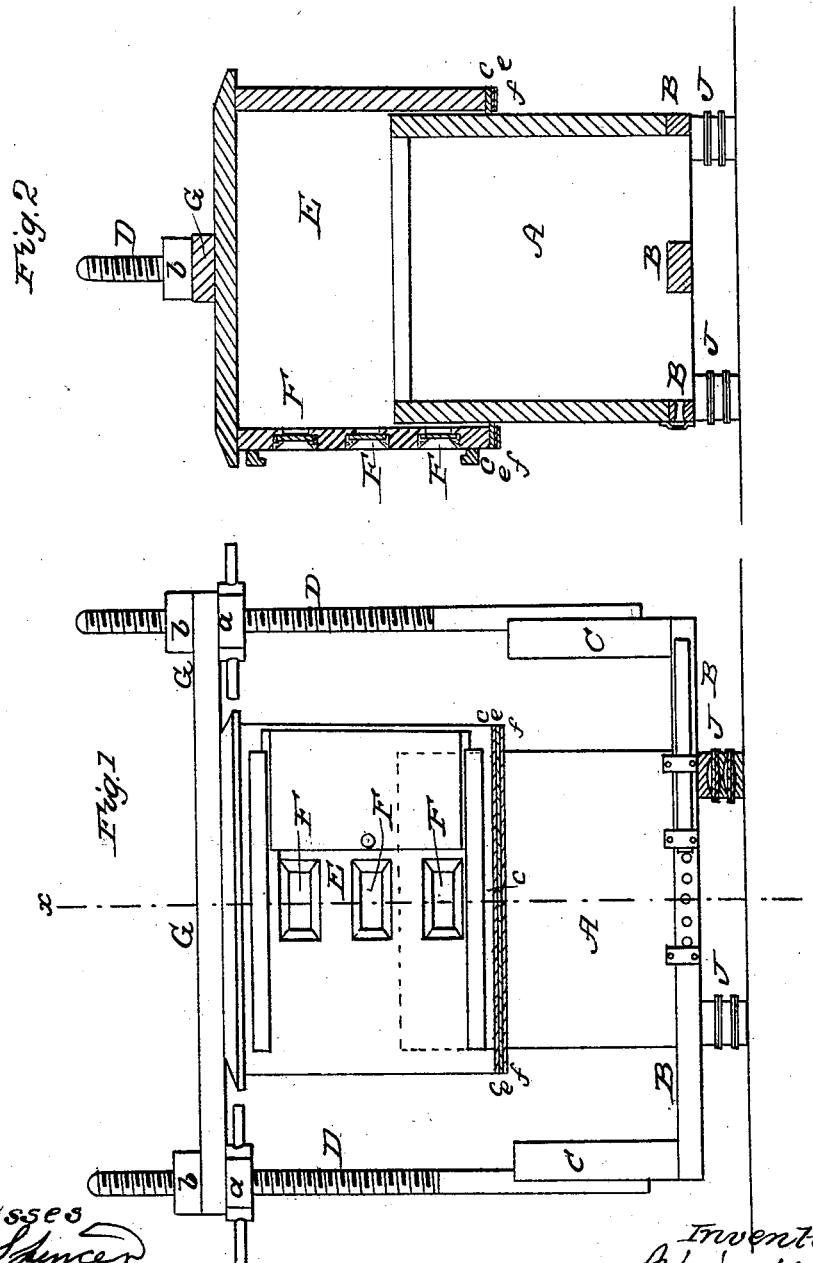

WILLIAM HYDE, OF EMERY, OHIO.

BEEHIVE.

Specification of Letters Patent No. 29,491, dated August 7, 1860.

*To all whom it may concern:*

Be it known that I, WILLIAM HYDE, of Emery, in the county of Fulton and State of Ohio, have invented a new and Improved Beehive; and I do hereby declare that the following is a full, clear, and exact description thereof, reference being had to the accompanying drawings, making part of this specification, in which—

Figure 1 represents a front elevation of my invention and improvement in beehives showing the same resting on galvanic piles or pedestals. Fig. 2 shows a vertical transverse section, taken through Fig. 1, as indicated by the red line $x$, $x$, marked thereon.

Similar letters of reference indicate corresponding parts in both figures.

This invention consists in combining with a bee hive an elevating box, or supplemental hive arranged in such a relation to the lower box or hive that the capacity of the hive may be gradually increased, as the honey is made, without disturbing the bees or honey, or without liability of being stung by them; and, in combination with the movable box, my invention consists in a novel manner of packing the joint of one box with the other, and in preventing the moth from entering the hives at this joint, all as will be hereinafter described and represented.

To enable those skilled in the art to fully understand my invention, I will proceed to describe its construction and operation.

In the drawings, A represents a quadrangular box, open at its bottom and top, with the entrance for bees near the bottom, as shown in Fig. 1. This box rests on a frame B, to which it is permanently attached, and said frame projects out from each end of the box a suitable distance and receives strong pedestals C, C, from which proceed up a suitable distance screw shafts D, D, which stand perpendicular to the frame B.

E is the supplemental hive which is also a quadrangular box open at its bottom but closed tightly at its top. This secondary box is made large enough to fit over the lower box as represented by Fig. 2, and to be moved up or down at pleasure. The side of this box is furnished with glasses F, for the admission of light to the interior of the hive. It is held up over the lower box and adjusted to any desirable height by a cross piece G, which is nailed on its top, projects out from its sides, and has a hole in each end, through which passes the perpendicular screws D, D, as shown by Fig. 1. On each screw are two nuts $a$, $b$. The lower one is used for elevating the box E, and the upper one for fixing it at any desired height.

Now when the bees first commence operations, the top box should be nearly down on the lower box, then, as the bees progress with their work the box is gradually elevated by the nuts $a$, $a$, and this rising may be continued until the lower edge of the box E, is up to the top edge of the box A, when the bees will continue to work and fill this lower box, and in this manner swarming may be prevented the entire season, and a greater amount of honey be thus obtained while the secondary box may be raised so gently and but a little at a time that the bees will not be in the least disturbed but will continue on in their daily vocation until the season closes.

It will be observed that in making these extension hives the point where the two boxes A, E, slide together would not always be sufficiently tight to prevent the harboring of insects, miller's eggs, and other destructive enemies to the bee, without some special provision for destroying such things. Therefore by reference to Fig. 2 it will be seen that I use a piece of cloth, $c$, or other soft material tacked to the edge of the upper box so as to project slightly over its inner edge, all around, this serves as a close packing, and with two metallic plates $e$, $f$, tacked under it, of different metals, which keep up a constant galvanic acting, will effectually prevent the ascent of worms.

The interior of the hive may be arranged and constructed in any of the well known ways for assisting the bees in the performance of their work. The hive rests on four or more posts J, composed of plates of different metals and having a suitable receptacle in them for containing any suitable acid or salt for keeping up a galvanic acid. This arrangement prevents the bee-moth from ascending to the hive.

Having thus described my invention, what I claim, and desire to secure by Letters Patent, is—

1. The combination of the box E, with the box A, when said box E, is arranged as specified for the purpose of increasing the capacity of the hive.

2. In combination with my extension hive, the use of cloth, or other suitable material, combined with galvanic plates, when applied in the manner and for the purposes described and represented.

WILLIAM HYDE.

Witnesses:
 JAMES J. KITTREDGE,
 CHARLES S. JONES.